(No Model.)

M. B. PENFIELD.
HOT PAN LIFTER.

No. 444,504. Patented Jan. 13, 1891.

Witnesses
Ira R. Steward
J. A. Rutherford

Inventor
Matie B. Penfield
By his Attorney
James L. Norris.

UNITED STATES PATENT OFFICE.

MATIE B. PENFIELD, OF DALLAS, TEXAS.

HOT-PAN LIFTER.

SPECIFICATION forming part of Letters Patent No. 444,504, dated January 13, 1891.

Application filed March 31, 1890. Serial No. 346,057. (No model.)

*To all whom it may concern:*

Be it known that I, MATIE B. PENFIELD, a citizen of the United States, residing at Dallas, in the county of Dallas and State of Texas, have invented new and useful Improvements in Hot-Pan Lifters, of which the following is a specification.

This invention relates to that type of implements for manipulating or handling hot tinware in the culinary art wherein a handle carrying a plate or blade to pass beneath the article to be lifted is provided with an arm pivoted at one end and adapted at its other end to engage the article resting on the plate or blade.

The objects of my invention are to improve and render such implement capable of more general application; to provide novel means whereby the various sizes of baking and other pans in the equipment of a kitchen can be conveniently and safely handled without danger of the pan being accidentally disengaged from the implement or carrier; to provide a novel hot-pan lifter which will in use have a positive toothed engagement with the rim of a hot pan or other culinary utensil; to provide novel, simple, and efficient means whereby the lifter or implement can be promptly and conveniently released from engagement with the pan or other cooking utensil by the simple pressure of the thumb of the hand which grasps the manipulating-handle of the device; to provide novel means whereby a thumb-lever pivoted on the handle can interlock with baking and other pans having rims of varying height, flare, or diameter, and to otherwise improve hot-pan lifters and render them more useful and secure in operation. To accomplish all these objects my invention involves the features of construction, the combination or arrangement of parts, and the principles of operation hereinafter described and claimed, reference being made to the accompanying drawings, in which—

Figure 1:
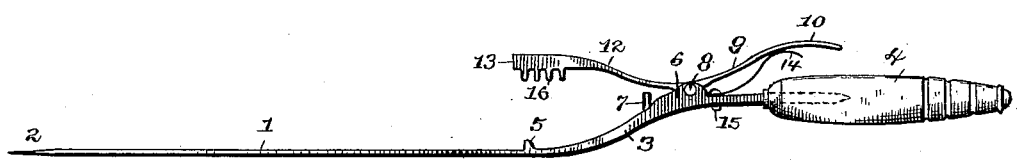
Figure 2:
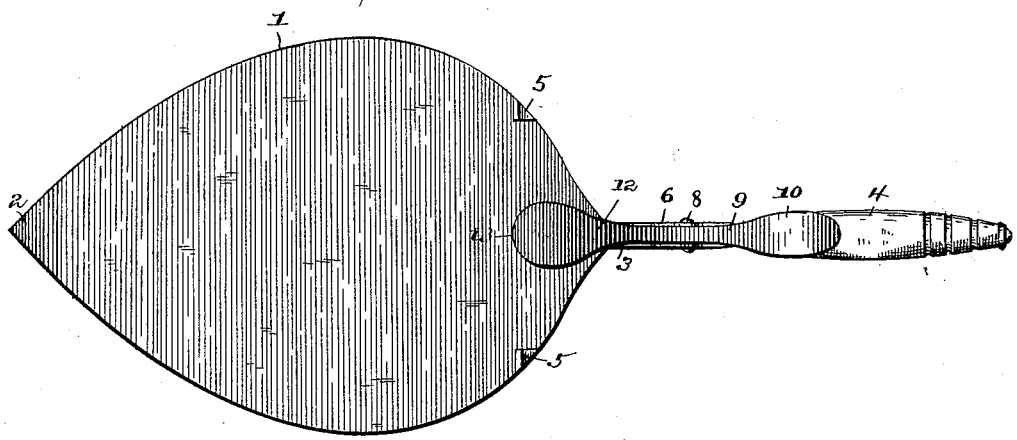

Figure 1 is a side elevation of an implement embodying my invention. Fig. 2 is a top plan view of the same.

In order to enable those skilled in the art to make and use my invention, I will now describe the same in detail, referring to the drawings, wherein—

The numeral 1 indicates a blade or plate beveled at the front edge 2 to form a cutter and also facilitate its insertion beneath the pan or article to be lifted or manipulated. The blade or plate is preferably metal and shaped like a trowel, and its rear edge is extended into a shank or tang 3, entering a non-conducting handle 4 of wood or other material suitable for the conditions required. The blade or plate is furnished with a stop lug or lugs 5 to abut the pan for properly limiting the insertion of the blade or plate thereunder, and the shank or tang is provided with side flanges 6, located between an upwardly-projecting stop-pin 7 and the inner end of the non-conducting handle to afford a bearing for the pivot-pin 8 of a thumb-lever 9, which is mounted at or near the middle of its length on the bearing through the medium of the pivot-pin. The rear end of the lever is fashioned into a thumb-piece 10, and the front end 12 is formed as a pan-engaging head 13, which overhangs the rear portion of the blade or plate. A leaf-spring 14 is secured at one end by a rivet 15 or otherwise to the shank or tang, and the free end of the spring bears against the thumb-lever at a point behind the pivot-pin for throwing the pan-engaging head toward the blade or plate. The stop-pin 7 serves as a rest for the thumb-lever to support the pan-engaging head in correct position for conveniently applying it to the article to be lifted or manipulated.

In a well-equipped kitchen there is usually a variety of baking and other pans, which differ in height and diameter, while the rims or flanges flare more or less, and to handle or manipulate any and all of such articles I provide the under side of the pan-engaging head of the lever with several transverse ribs, arranged parallel to each and constituting teeth 16 for interlocking, as it were, with the edge of the pan rim or flange in such manner as to securely retain the hot pan or article on the blade or plate, and thereby avoid all danger of the pan accidentally slipping from the lifter while moving the same from the oven or stove-plate to a table or during other manipulations of the hot dish.

The implement constructed as described is useful for various purposes in the kitchen besides lifting and manipulating hot pans and the like, as the trowel-blade can be used as a cutter or chopper or as a mixer or beater or cake-turner.

In practice the blade is inserted beneath the pan until the latter strikes the stop-lugs and the toothed head is caused to engage or interlock with the edge of the pan rim or flange. The pan can then be moved or carried, as may be desired, and can be promptly and conveniently released by simple pressure of the thumb of the hand which is grasping the handle of the implement. It will be obvious that the rim of the pan, according to its size or diameter, will engage between one or the other pair of teeth on the pan-engaging head of the lever, and therefore the implement is well adapted for pans of varying size, which is a material advantage.

Having thus described my invention, what I claim is—

1. A hot-pan lifter consisting of a blade having a shank, a lever pivoted to the latter and having a head provided with teeth to engage or interlock with the edge of the pan-rim, and a spring for throwing the toothed head into engagement with the pan-rim, substantially as described.

2. A hot-pan lifter consisting of a blade having a shank, a rocking thumb-lever pivoted at or near the middle of its length on the shank and having its front end formed into a head having a series of transverse teeth on its under side, and a spring acting on the thumb-lever to throw the toothed head into engagement with the pan-rim, substantially as described.

3. A hot-pan lifter consisting of a trowel-blade having stop-lugs and a shank carrying a handle and provided with an upwardly-projecting stop-pin, a thumb-lever pivoted at or near the middle of its length, adapted to rest on the stop-pin, and formed at its front end into a pan-engaging head, and a spring acting on the thumb-lever to normally hold it at rest on the stop-pin, substantially as described.

In testimony whereof I have affixed my signature in presence of two witnesses.

MATIE B. PENFIELD.

Witnesses:
GEO. H. MAYR,
F. H. KIMBALL.